United States Patent
Castillo-Effen et al.

(10) Patent No.: US 9,177,479 B2
(45) Date of Patent: Nov. 3, 2015

(54) SYSTEM AND METHOD FOR DETERMINING AIRCRAFT OPERATIONAL PARAMETERS AND ENHANCING AIRCRAFT OPERATION

(71) Applicant: General Electric Company, Schenectady, NY (US)

(72) Inventors: Mauricio Castillo-Effen, Rexford, NY (US); Harold Woodruff Tomlinson, Ballston Spa, NY (US); Liling Ren, Rexford, NY (US); Benjamin Eric Shanks, Carrboro, NC (US)

(73) Assignee: General Electric Company, Niskayuna, NY (US)

( * ) Notice: Subject to any disclaimer, the term of this patent is extended or adjusted under 35 U.S.C. 154(b) by 206 days.

(21) Appl. No.: 13/798,743

(22) Filed: Mar. 13, 2013

(65) Prior Publication Data
US 2014/0277853 A1    Sep. 18, 2014

(51) Int. Cl.
*B64C 19/00* (2006.01)
*G08G 5/00* (2006.01)
(Continued)

(52) U.S. Cl.
CPC .............. *G08G 5/0034* (2013.01); *G05D 1/101* (2013.01); *G06F 7/00* (2013.01); *G06Q 10/047* (2013.01); *G08G 5/0095* (2013.01)

(58) Field of Classification Search
CPC ... G08G 5/0039; G08G 5/0013; G08G 5/045; G08G 5/0052; G08G 5/0082; G08G 5/0043; G08G 5/0091; G08G 5/0034; G08G 5/0078; G08G 5/0008; G08G 5/003; G08G 5/006; G08G 5/025; G08G 5/0021
USPC .............. 701/3, 14, 120, 122, 415, 528, 301, 701/466; 340/961, 945, 971, 976, 978
See application file for complete search history.

(56) References Cited

U.S. PATENT DOCUMENTS

| 5,479,360 A | 12/1995 | Seif et al. |
| 6,134,500 A | 10/2000 | Tang et al. |

(Continued)

FOREIGN PATENT DOCUMENTS

| CN | 101692315 B | 4/2010 |
| EP | 2482269 A1 | 8/2012 |

(Continued)

OTHER PUBLICATIONS

GB Search Report and Written Opinion issued in connection with corresponding GB Application No. GB1404245.1 on Sep. 15, 2014.
(Continued)

*Primary Examiner* — John R Olszewski
*Assistant Examiner* — Truc M Do
(74) *Attorney, Agent, or Firm* — John P. Darling

(57) ABSTRACT

A method for identifying variations in aircraft operational parameters includes processing a four-dimensional (4D) aircraft trajectory for a flight along a defined route. The method also includes determining an aircraft intent corresponding to the flight along the defined route based at least in part on an aircraft performance model from a trajectory predictor. The aircraft intent includes multiple segments and corresponding intent parameters. In addition, the method includes adjusting the intent parameters such that a computed 4D trajectory substantially corresponds to the 4D aircraft trajectory. The method further includes determining a computed operational parameter based at least in part on the computed 4D trajectory and the aircraft performance model from the trajectory predictor. In addition, the method includes identifying variations between the computed operational parameter and a corresponding measured operational parameter.

20 Claims, 7 Drawing Sheets

(51) Int. Cl.
   *G06F 7/00* (2006.01)
   *G05D 1/10* (2006.01)
   *G06Q 10/04* (2012.01)

(56) References Cited

U.S. PATENT DOCUMENTS

| | | | |
|---|---|---|---|
| 6,188,937 B1 | 2/2001 | Sherry et al. | |
| 6,820,006 B2 | 11/2004 | Patera | |
| 6,873,903 B2 | 3/2005 | Baiada et al. | |
| 7,026,979 B2 | 4/2006 | Khosla | |
| 7,030,809 B2 | 4/2006 | McCabe et al. | |
| 7,248,949 B2 | 7/2007 | Love et al. | |
| 7,366,591 B2 | 4/2008 | Hartmann et al. | |
| 7,626,533 B2 | 12/2009 | Cong et al. | |
| 7,650,232 B1 | 1/2010 | Paielli | |
| 7,835,825 B2 | 11/2010 | Coulmeau et al. | |
| 7,835,866 B2 | 11/2010 | Tzidon | |
| 7,907,067 B2 | 3/2011 | Baker et al. | |
| 7,987,145 B2 | 7/2011 | Baramov | |
| 8,050,807 B2 | 11/2011 | Varon | |
| 8,089,393 B2 | 1/2012 | Nettleton et al. | |
| 8,332,084 B1* | 12/2012 | Bailey et al. | 701/10 |
| 8,798,898 B2* | 8/2014 | Castillo-Effen et al. | 701/120 |
| 8,862,287 B1* | 10/2014 | Clark et al. | 701/3 |
| 2002/0198681 A1 | 12/2002 | Kouritzin et al. | |
| 2004/0097766 A1 | 5/2004 | Livingston | |
| 2006/0095156 A1* | 5/2006 | Baiada et al. | 700/213 |
| 2006/0173609 A1* | 8/2006 | Green | 701/120 |
| 2007/0078572 A1* | 4/2007 | Deker et al. | 701/3 |
| 2007/0142981 A1* | 6/2007 | Gutierrez-Castaneda et al. | 701/3 |
| 2008/0021648 A1* | 1/2008 | Wilson | 701/301 |
| 2009/0042405 A1 | 2/2009 | Doczy et al. | |
| 2009/0088972 A1* | 4/2009 | Bushnell | 701/210 |
| 2009/0112535 A1 | 4/2009 | Phillips | |
| 2009/0125221 A1* | 5/2009 | Estkowski et al. | 701/120 |
| 2009/0292408 A1 | 11/2009 | Shafaat et al. | |
| 2009/0326742 A1 | 12/2009 | Varon | |
| 2010/0100308 A1* | 4/2010 | Coulmeau et al. | 701/122 |
| 2010/0152930 A1* | 6/2010 | Coulmeau et al. | 701/7 |
| 2010/0281411 A1 | 11/2010 | Baker et al. | |
| 2010/0292871 A1* | 11/2010 | Schultz et al. | 701/3 |
| 2010/0305781 A1 | 12/2010 | Felix et al. | |
| 2011/0117242 A1 | 5/2011 | Gutknecht et al. | |
| 2011/0295501 A1 | 12/2011 | Gutierez-Castaneda et al. | |
| 2012/0116614 A1* | 5/2012 | Torres et al. | 701/3 |
| 2012/0191332 A1* | 7/2012 | Sawhill et al. | 701/120 |
| 2012/0209457 A1* | 8/2012 | Bushnell | 701/13 |
| 2012/0215433 A1* | 8/2012 | Subbu et al. | 701/120 |
| 2012/0215434 A1* | 8/2012 | Subbu et al. | 701/120 |
| 2012/0215435 A1* | 8/2012 | Subbu et al. | 701/120 |
| 2012/0245834 A1* | 9/2012 | Klooster et al. | 701/120 |
| 2013/0006512 A1* | 1/2013 | Saggio et al. | 701/120 |
| 2013/0006533 A1* | 1/2013 | Lax et al. | 702/3 |
| 2013/0080043 A1* | 3/2013 | Ballin et al. | 701/120 |
| 2013/0085661 A1* | 4/2013 | Chan et al. | 701/122 |
| 2013/0184978 A1* | 7/2013 | Subbu et al. | 701/120 |

FOREIGN PATENT DOCUMENTS

| | | | |
|---|---|---|---|
| EP | 2685440 A1 | 1/2014 | |
| WO | 2006085952 A1 | 8/2006 | |
| WO | 2011117242 A1 | 9/2011 | |
| WO | WO 2011117242 A1 * | 9/2011 | |

OTHER PUBLICATIONS

Jilkov et al., "Design and comparison of mode-set adaptive imm algorithms for maneuvering target tracking", IEEE Transactions on Aerospace and Electronic Systems, vol. 35,Issue1, pp. 343-350, Jan. 1999.

Krozel.,"Intent inference for free flight aircraft", In AIAA Guidance, Navigation, and Control Conference, 2000, Denver, CO.

Hwang et al.,"Performance analysis of hybrid estimation algorithms", 42ndIEEE Conference online Decision and Control, 2003. Proceedings, vol. 5, pp. 5353-535, Dec. 9-12, 2003.

Hwang et al.,"Flight-mode-based aircraft conflict detection using a residual-mean interacting multiple model algorithm", In Proceedings of the AIAA guidance, navigation, and control conference, 2003.

Krozel et al., "Intent Inference and Strategic Path Prediction", AIAA Guidance, Navigation, and Control Conference and Exhibit, pp. 1-6, Location: San Francisco, CA; USA, Aug. 15-18, 2005.

Krozel et al. "Intent inference with path prediction", Journal of Guidance, Control, and Dynamics, vol. 29, Issue 2, pp. 225-236, Mar.-Apr. 2006.

Hwang et al.,"State estimation for hybrid systems: applications to aircraft tracking", IEE Proceedings Control Theory and Applications, vol. 153.Issue 5, pp. 556-566, Sep. 2006.

Hwang et al.,"An estimation algorithm for stochastic linear hybrid systems with continuous-state-dependent mode transitions", 45th IEEE Conference onIn Decision and Control, pp. 131-136, Dec. 13-15, 2006.

Yepes et al., "New algorithms for aircraft intent inference and trajectory prediction",Journal of guidance, control, and dynamics, vol. 30,Issue 2,pp. 370-382, 2007.

Foo et al., "Application of Intent Inference for Surveillance and Conformance Monitoring to Aid Human Cognition", 10th International Conference on Information Fusion, pp. 1-8, Location: Singapore, Jul. 9-12, 2007.

Seah et al.,"Stability analysis of the interacting multiple model algorithm", American Control Conference, pp. 2415-2420, Jun. 2008.

Garcia et al., "Trajectory Reconstruction Techniques for Evaluation of ATC Systems", Tyrrhenian International Workshop on Digital Communications—Enhanced Surveillance of Aircraft and Vehicles, pp. 1-6, Sep. 3-5, 2008.

Xi et al., "Simulation Study of Algorithms for Aircraft Trajectory Prediction Based on ADS-B Technology", Asia Simulation Conference—7th International Conference on System Simulation and Scientific Computing, pp. 322-327, Oct. 10-12, 2008.

Hwang et al., "Intent-Based Probabilistic Conflict Detection for the Next Generation Air Transportation System", Proceedings of the IEEE, vol. 96 Issue 12, pp. 2040-2059, Dec. 2008.

Seah etal.,"State estimation for stochastic linear hybrid systems with continuous-state-dependent transitions: An imm approach", IEEE Transactions onAerospace and Electronic Systems, vol. 45, Issue1, pp. 376-392, Jan. 2009.

Seah et al.,"Stochastic linear hybrid systems: Modeling, estimation, and application in air traffic control", IEEE Transactions on Control Systems Technology, vol. 17, Issue 3, pp. 563-575, May 2009.

Liu, et al., Estimation algorithm for stochastic linear hybrid systems with quadratic guard conditions,48th IEEE Conference on Decision and Control and 28th Chinese Control Conference, pp. 3946-3951, Dec. 2009.

Mandela, et al.,"Nonlinear state estimation of differential algebraic systems",7th IFAC International Symposiumon Advanced Control of Chemical Process, 2009.

Seah et al.,"Terminal-area aircraft tracking using hybrid estimation",Journal of guidance, control, and dynamics, vol. 32, Issue 3, pp. 836-849, 2009.

Liu et al.,"Robust estimation algorithm for a class of hybrid systems with unknown continuous fault inputs", American ControlConference (ACC), pp. 136-141, Jun. 30, 2010-Jul. 2, 2010.

Schuster et al., "High-performance trajectory prediction for civil aircraft", IEEE/AIAA 29thIn Digital Avionics Systems Conference (DASC),pp. 1.C.3-1-1.C.3-9, Oct. 3-7, 2010.

Gallo et al., "Prediction of Descent Trajectories Based on Aircraft Intent", IEEE/AIAA 29th Digital Avionics Systems Conference (DASC), pp. 2.D.1-1-2.D.1-16, Oct. 3-7, 2010.

Seah et al.,"Algorithm for conformance monitoring in air traffic control",Journal of guidance, control, and dynamics, vol. 33,Issue 2, pp. 500-509, 2010.

Mandela et al.,"Recursive state estimation techniques for nonlinear differential algebraic systems. Chemical Engineering Science", vol. 65, Issue 16, pp. 4548-4556, 2010.

Seah et al.,"Algorithm for performance analysis of the imm algorithm",IEEE Transactions on Aerospace and Electronic Systems, vol. 47, Issue 2, pp. 1114-1124, Apr. 2011.

(56) References Cited

OTHER PUBLICATIONS

Shotton et al.,"Real-time human pose recognition in parts from single depth images",CVPR, vol. 2, pp. 7, 2011. FATHI.,"Recent hot machine learning hammers used in computer vision", 2011.

Liu et al.,"Probabilistic 4D trajectory prediction and conflict detection for air traffic control",Journal of Guidance, Control, and Dynamics, vol. 34, Issue 6, pp. 1779-1789, 2011.

Schuster et al."High-accuracy four dimensional trajectory prediction for civil aircraft", 2012.

"Automated Real Time 4D Trajectory Prediction for Airborne Threats", MOSAIC ATM, Product Catalogue.

Unofficial English Translation of Spanish Office Action issued in connection with corresponding ES Application No. 201430284 on Feb. 4, 2015.

* cited by examiner

SYSTEM AND METHOD FOR DETERMINING AIRCRAFT OPERATIONAL PARAMETERS AND ENHANCING AIRCRAFT OPERATION

BACKGROUND

The subject matter disclosed herein relates to a system and method for determining aircraft operational parameters and enhancing aircraft operation.

Aircraft may fly a variety of trajectories along one or more routes. However, inefficiencies associated with operation of the aircraft, such as improper trim, engine performance degradation, and excessive drag due to external surface wear, may reduce the performance of the aircraft. Accordingly, operational parameters, such as fuel usage, flight time, and flight cost, among others, may be degraded. Unfortunately, because the operational parameters may be influenced by external factors, such as variations in the trajectories, weather conditions, aircraft weight, and/or other factors, it is typically difficult to identify the actual performance inefficiencies by examining variations in the operational parameters. In addition, present systems lack techniques to determine the operational parameters with sufficient accuracy to identify the inefficiencies. For example, if an aircraft consumes more fuel than expected, it may be difficult to determine whether the cause of the extra fuel usage was an uncontrollable external factor (e.g., a strong headwind) or aircraft performance inefficiency (e.g., improper trim). As a result, aircraft may be operated for long periods with undetected inefficiencies, thereby increasing costs associated with aircraft operations.

BRIEF DESCRIPTION

In one embodiment, a method for identifying variations in aircraft operational parameters includes processing a four-dimensional (4D) aircraft trajectory for a flight along a defined route. The method also includes determining an aircraft intent corresponding to the flight along the defined route based at least in part on an aircraft performance model from a trajectory predictor. The aircraft intent includes multiple segments and corresponding intent parameters. In addition, the method includes adjusting the intent parameters such that a computed 4D trajectory substantially corresponds to the 4D aircraft trajectory. The computed 4D trajectory is determined based at least in part on the aircraft intent, the adjusted intent parameters, and the aircraft performance model from the trajectory predictor. The method further includes determining a computed operational parameter based at least in part on the computed 4D trajectory and the aircraft performance model from the trajectory predictor. In addition, the method includes identifying variations between the computed operational parameter and a corresponding measured operational parameter.

In another embodiment, a system for identifying variations in aircraft operational parameters includes a storage device configured to store a four-dimensional (4D) aircraft trajectory for a flight along a defined route. The system also includes control circuitry communicatively coupled to the storage device. The control circuitry is configured to determine an aircraft intent corresponding to the flight along the defined route based at least in part on an aircraft performance model from a trajectory predictor. The aircraft intent includes multiple segments and corresponding intent parameters. The control circuitry is also configured to adjust the intent parameters such that a computed 4D trajectory substantially corresponds to the 4D aircraft trajectory. The computed 4D trajectory is determined based at least in part on the aircraft intent, the adjusted intent parameters, and the aircraft performance model from the trajectory predictor. In addition, the control circuitry is configured to determine a computed operational parameter based at least in part on the computed 4D trajectory and the aircraft performance model from the trajectory predictor. Furthermore, the control circuitry is configured to identify variations between the computed operational parameter and a corresponding measured operational parameter. The system also includes an interface communicatively coupled to the control circuitry. The interface is configured to present the variations to an operator.

In a further embodiment, a method for enhancing aircraft operational parameters includes determining an aircraft intent corresponding to a flight along a defined route based at least in part on four-dimensional (4D) aircraft trajectories from corresponding previous flights along the defined route and an aircraft performance model from a trajectory predictor. The aircraft intent includes multiple segments and corresponding intent parameters. The method also includes determining a first computed 4D trajectory based at least in part on the aircraft intent and the aircraft performance model from the trajectory predictor. In addition, the method includes determining a first computed operational parameter based at least in part on the first computed 4D trajectory and the aircraft performance model from the trajectory predictor. The method further includes iteratively adjusting at least one intent parameter such that a second computed operational parameter of a second computed 4D trajectory has a more desirable value than the first computed operational parameter of the first computed 4D trajectory. The second computed 4D trajectory is determined based at least in part on the aircraft intent, the at least one intent parameter, and the aircraft performance model from the trajectory predictor, and the second computed operational parameter is determined based at least in part on the second computed 4D trajectory and the aircraft performance model from the trajectory predictor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
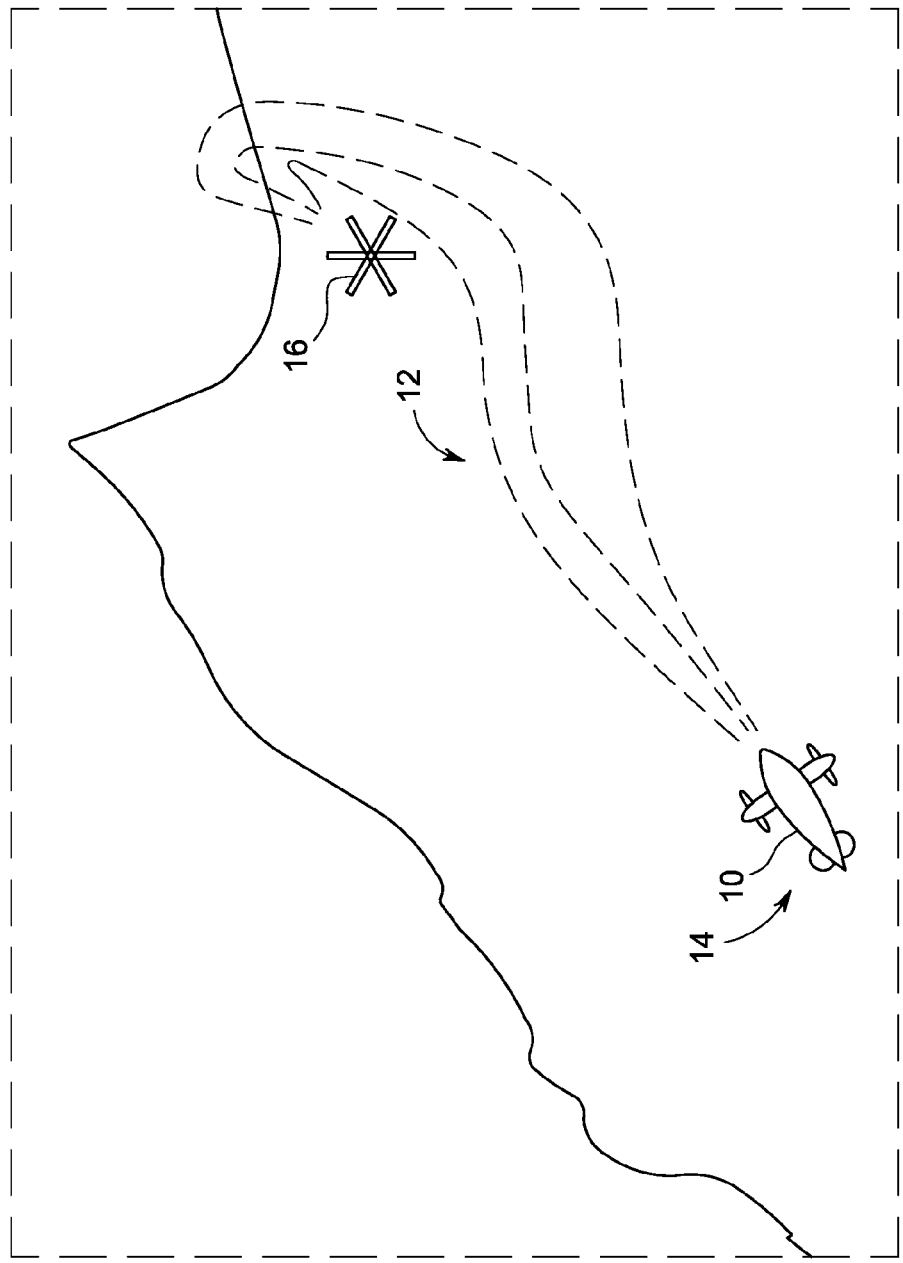
FIG. 1 is a chart showing multiple exemplary aircraft trajectories along a common route.

FIG. 1 is a chart showing multiple exemplary aircraft trajectories along a route. As illustrated, an aircraft 10 may fly a variety of trajectories 12 from an origin 14 to a destination, such as the illustrated airport 16. Due to external factors, such as variations in the trajectories 12, weather conditions, aircraft weight, and/or other factors, operational parameters (e.g., fuel usage, flight time, flight cost, etc.) may vary between flights along the common route. In addition, inefficiencies associated with operation of the aircraft, such as improper trim, engine inefficiencies, and excessive drag, may also cause variations in the operational parameters. As discussed in detail below, systems and methods may be utilized to account for the variations associated with the external factors, thereby facilitating identification of variations caused by the aircraft inefficiencies. Accordingly, the inefficiencies may be detected and/or mitigated based on the identified variations in the operational parameters.

In certain embodiments, variations in aircraft operational parameters (e.g., variations associated with anomalous aircraft operation) may be identified, thereby facilitating detection and/or mitigation of inefficiencies associated with operation of the aircraft, or a fleet of aircraft. To identify the variations, a four-dimensional (4D) aircraft trajectory for a flight along a defined route is processed by a trajectory computation system. The trajectory computation system also processes an aircraft intent corresponding to the flight along the defined route. As discussed in detail herein, the aircraft intent is determined based at least in part on an aircraft performance model from a trajectory predictor. Using the 4D aircraft trajectory, the aircraft intent, and the aircraft performance model from the trajectory predictor, the trajectory computation system adjusts multiple intent parameters of the aircraft intent such that a computed 4D trajectory substantially corresponds to the 4D aircraft trajectory. The computed 4D trajectory is based at least in part on the aircraft intent and the aircraft performance model from the trajectory predictor. The trajectory computation system then determines a computed operational parameter (e.g., a computed fuel usage, a computed flight cost, a computed flight time, etc.) based at least in part on the computed 4D trajectory and the aircraft performance model from the trajectory predictor. Because the aircraft intent, the computed 4D trajectory, and the computed operational parameter are determined based at least in part on the aircraft performance model from the trajectory predictor, variations associated with the external factors (e.g., trajectory variations, variations in aircraft weight, variations in weather conditions, etc.) may be included (e.g., accounted for) in the computed operational parameter. Accordingly, variations between the computed operational parameter (e.g., computed fuel usage) and a corresponding measured operational parameter (e.g., measured fuel usage) may be indicative of aircraft inefficiencies (e.g., improper trim, engine inefficiencies, excessive drag, etc.). Identifying these inefficiencies may enable aircraft maintenance personnel, for example, to mitigate or repair the underlying cause of the inefficiencies, thereby enhancing the operational efficiency of the aircraft.

Figure 2:
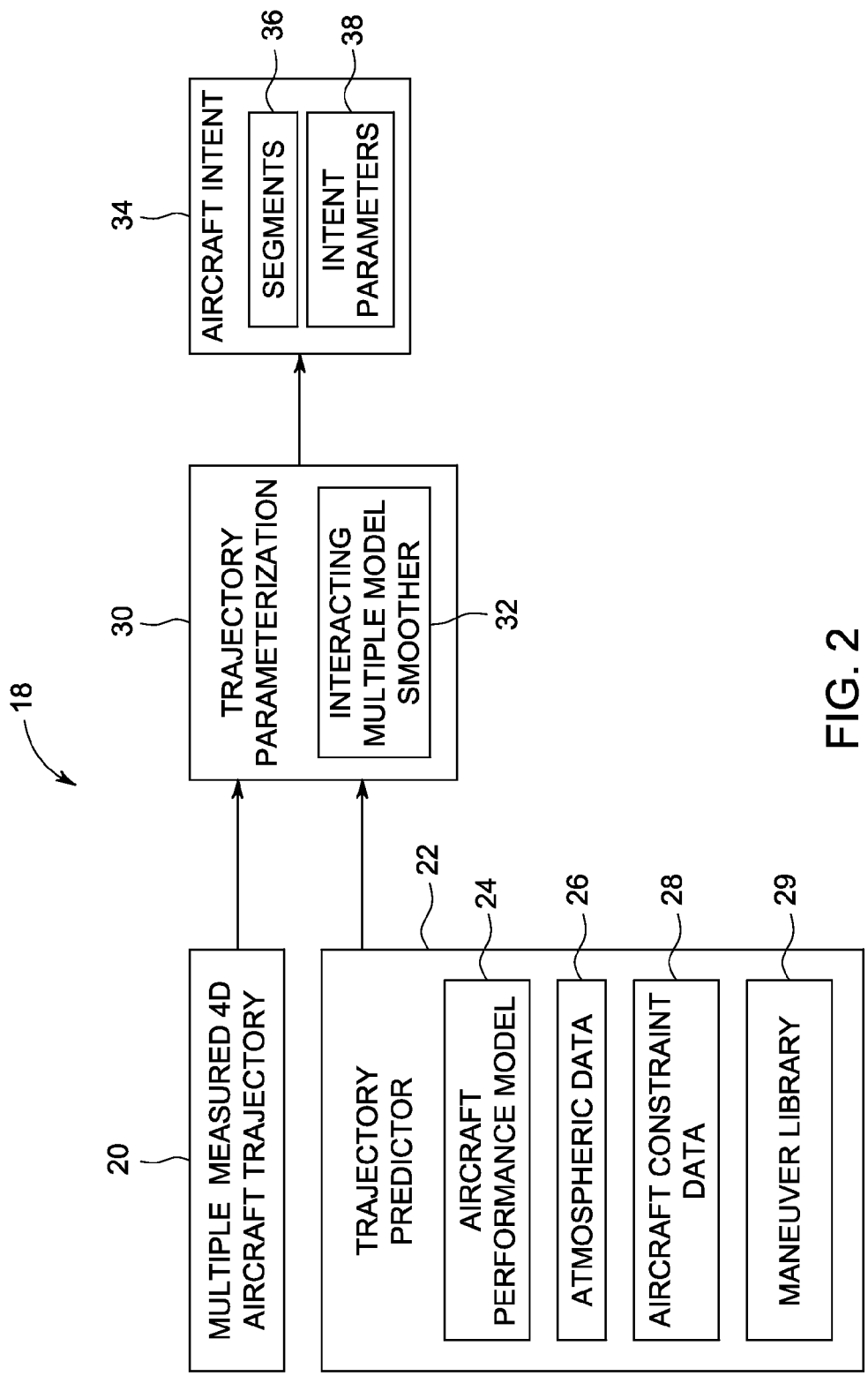
FIG. 2 is a block diagram of an embodiment of a system for determining aircraft intent based on multiple aircraft trajectories.

FIG. 2 is a block diagram of an embodiment of a system 18 for determining aircraft intent based on multiple aircraft trajectories. As discussed in detail below, aircraft intent includes a series of maneuvers associated with a flight along a defined route. In the illustrated embodiment, the aircraft intent is determined based at least in part on multiple measured 4D aircraft trajectories 20 from previous corresponding flights along the defined route (e.g., from one or more aircraft). The measured 4D aircraft trajectories include position of the aircraft in three dimensions as a function of time. The measured 4D aircraft trajectories 20 may be recorded from RADAR data and/or from a flight data recorder (e.g., quick access recorder) onboard the aircraft. Because the measured 4D aircraft trajectories 20 are based on measured data, the trajectories may include noise, erroneous data points (e.g., outliers), and gaps in the data.

The aircraft intent is also determined based at least in part on data and/or an aircraft performance model from a trajectory predictor 22. In certain embodiments, the trajectory predictor 22 substantially corresponds to an onboard flight management system of an aircraft associated with the flight along the defined route. Certain aircraft include a flight management system to compute a desired trajectory and/or expected operational parameters (e.g., fuel usage, flight time, etc.) during operation of the aircraft. The computations may be based at least in part on a flight plan, atmospheric data, and/or flight specific performance information (e.g., aircraft load, engine performance data, etc.). In certain configurations, the onboard flight management system may output the computed trajectory to a flight control system, which, in turn, automatically guides the aircraft along the computed trajectory. Because the trajectory predictor 22 substantially corresponds to the onboard flight management system (e.g., the trajectory predictor 22 computes substantially similar trajectories and/or operational parameters as the onboard flight management system based on substantially similar inputs), accurate data and/or modeling of aircraft performance is provided for computation of aircraft intent.

As illustrated, the trajectory predictor 22 includes data, such as an aircraft performance model 24, atmospheric data 26, aircraft constraint data 28, and an aircraft maneuver library 29. However, it should be appreciated that the trajectory predictor 22 may include additional data in further embodiments (e.g., a navigation database, a flight mode database, etc.). In the illustrated embodiment, the aircraft performance model 24 includes an accurate representation of the performance of the aircraft associated with the model. For example, the aircraft performance model 24 may include aircraft-specific parameters associated with the aircraft control system, the aircraft aerodynamics, engine performance, and so forth. As previously discussed, because the trajectory predictor 22 substantially corresponds to an onboard flight management system of an aircraft associated with the flight along the defined route, the data provided by the aircraft performance model 24 may accurately represent the actual aircraft performance. As will be appreciated, the atmospheric data 26 may include wind direction and/or velocity, air temperature, air pressure, and so forth. The atmospheric data 26 may be recorded by the onboard data recorder and/or measured by a weather monitoring station. It should be appreciated that the atmospheric data 26 substantially corresponds to the flight along the defined route. In addition, the aircraft constraint data 28 and the aircraft maneuver library 29 may include parameters that limit operation of the aircraft. For example, the constraint data may include minimum and/or maximum speed as a function of operating altitude, maximum turn rate as a function of aircraft speed, and so forth.

The multiple measured 4D aircraft trajectories 20 and the trajectory predictor data/functionality are provided to a trajectory parameterization system 30. The trajectory parameterization system 30 is configured to determine aircraft intent based at least in part on the aircraft performance model 24 from the trajectory predictor 22 and the multiple measured 4D aircraft trajectories 20. In addition, the atmospheric data 26 and/or the aircraft constraint data 28 may also be used in the aircraft intent computation. In certain embodiments, the trajectory parameterization system 30 may determine aircraft intent via dual optimal smoothing (e.g., of aircraft state and operational parameters). For example, in certain embodiments, the trajectory parameterization system 30 may use interacting multiple model smoothing 32.

As previously discussed, the trajectory parameterization system 30 determines the aircraft intent 34 based at least in part on the multiple measured 4D aircraft trajectories 20 and the aircraft performance model 24. As illustrated, the aircraft intent 34 includes multiple segments 36 and corresponding intent parameters 38 associated with the segments. The segments 36 collectively represent the flight along the defined route. In the illustrated embodiment, the trajectory parameterization system 30 is configured to decompose the expected trajectory into a series of maneuvers or segments 36 that define the flight along the defined route. For example, the segments may include climbing flight at a desired climb rate, a coordinated turn at a desired bank angle, straight and level flight, flight at a constant Mach number, and/or flight at a constant calibrated airspeed, among other segments. The intent parameters 38 at least partially define the aircraft performance through each segment. For example, in a climbing flight segment, a parameter may indicate the desired climb rate. Similarly, during a constant calibrate airspeed segment, a parameter may define the constant calibrated airspeed.

In certain embodiments, the interacting multiple model smoother 32 employs multiple models to determine the aircraft intent 34. For example, the smoother 32 may utilize a model associated with a climbing flight mode, a model associated with a coordinated turn mode, a model associated with a constant Mach number mode, and a model associated with a straight and level flight mode, among others. During the smoothing process, the most likely mode for each segment may be determined based on optimal estimation techniques. The smoother 32 also facilitates determination of the boundaries of each segment (e.g., based on residuals that indicate a model has a lower likelihood of being active). The smoothing process may be performed during operation of the aircraft by analyzing the previously flown aircraft state and operational parameters (e.g., stored within an onboard data recorder), and/or the smoothing process may be performed based on RADAR data from a previous flight along a defined route.

Because the aircraft intent is based at least in part on multiple measured 4D aircraft trajectories 20 along a defined route, variations among the trajectories are smoothed to establish an accurate representation of an expected trajectory along the defined route. In addition, because the aircraft intent 34 is based at least in part on accurate data from the trajectory predictor 22, variations in the trajectory caused by aircraft performance and/or weather conditions may be considered/accounted for in determining the aircraft intent 34. In addition, the aircraft constraint data 28 may be used to "filter" the measured 4D trajectories to reduce anomalies in the measured data, thereby providing more accurate input data for determining the aircraft intent. For example, if a measured 4D trajectory indicates that a velocity of an aircraft exceeds a maximum threshold value, as defined by the aircraft constraint data, the data point associated with the excessive velocity may be removed from the measured trajectory. Because the aircraft intent 34 is based at least in part on data from the trajectory predictor 22, the aircraft intent 34 may be significantly more accurate than an aircraft intent determined based on measured trajectories alone. As a result, an accurate computed operational parameter may be determined from the aircraft intent 34, thereby facilitating identification of variations between the computed operational parameter and a measured operational parameter.

Figure 3:
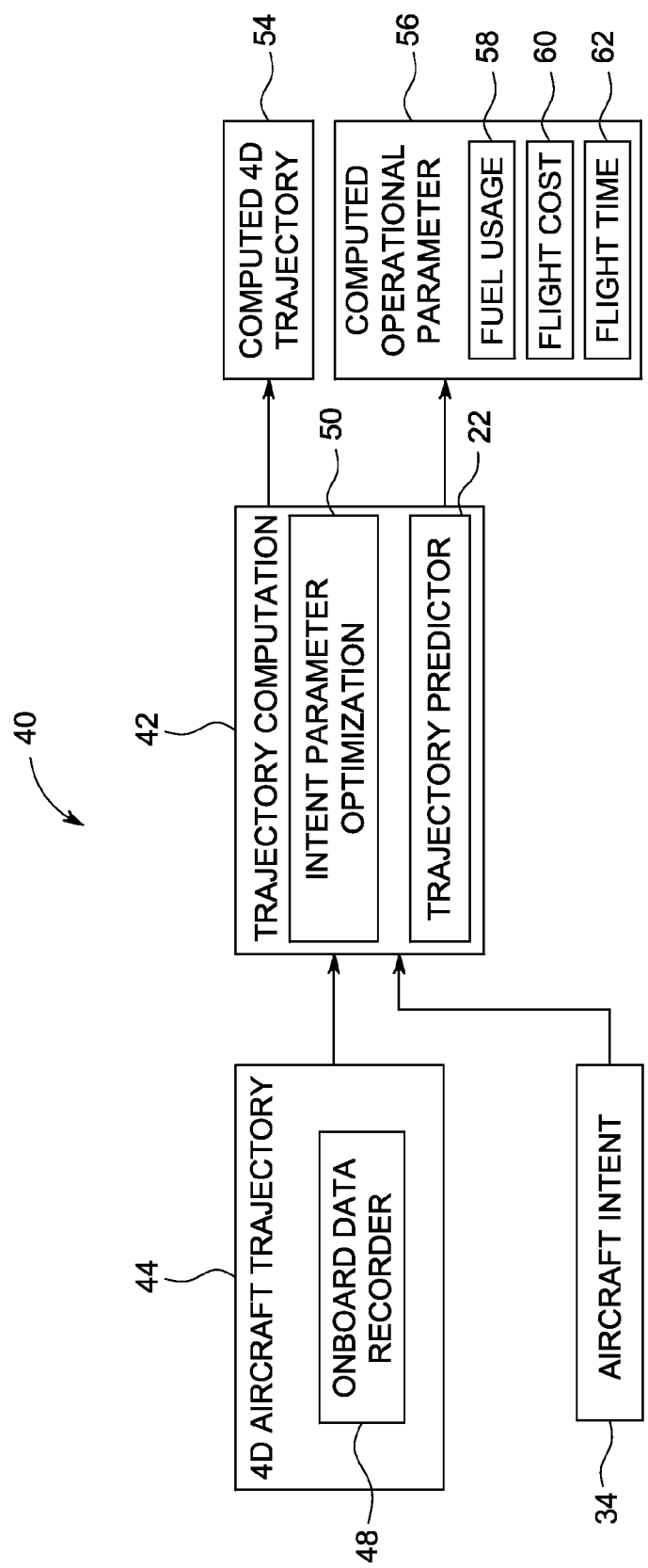
FIG. 3 is a block diagram of an embodiment of a system for determining a computed operational parameter based on an aircraft trajectory.

FIG. 3 is a block diagram of an embodiment of a system 40 for determining a computed operational parameter based on an aircraft trajectory. In the illustrated embodiment, a trajectory computation system 42 processes a 4D aircraft trajectory 44 for a flight along a defined route. The aircraft trajectory 44 may be provided by an onboard data recorder 48 and/or obtained from an external source. As will be appreciated, the trajectory 44 from the onboard data recorder 48 (or external source) may include noise, erroneous data points (e.g., outliers), and gaps in the data. The trajectory computation system 42 is also configured to process the aircraft intent 34 from the trajectory parameterization system 30, and data from the trajectory predictor 22, such as the aircraft performance model 24, the atmospheric data 26, and/or the aircraft constraint data 28.

In the illustrated embodiment, the trajectory computation system 42 includes an intent parameter optimization system 50 and the trajectory predictor 22. The trajectory predictor 22 is configured to determine a computed 4D trajectory 54 based on the aircraft intent 34 and the aircraft performance model. The parameter optimization system 50 is configured to adjust the intent parameters of the aircraft intent such that the computed 4D trajectory 54 substantially corresponds to the 4D aircraft trajectory 44. Once the intent parameters are established, a computed operational parameter 56 is determined (e.g., by the trajectory predictor 22) based at least in part on the computed 4D trajectory 54 and the aircraft performance model from the trajectory predictor. In certain embodiments, the operational parameters may include fuel usage, 58, flight cost 60, flight time 62, and/or other parameters associated with operation of the aircraft.

As previously discussed, the aircraft intent 34 is based at least in part on data from the trajectory predictor 22. Accordingly, the aircraft intent 34 may be significantly more accurate than aircraft intent determined based on measured trajectories alone. In addition, the computed 4D trajectory 54 and the computed operational parameter 56 are also based at least in part on data from the trajectory predictor 22. As a result, the computed operational parameter may be significantly more accurate than a computed operational parameter determined without the use of the trajectory predictor. As discussed in detail below, the computed operational parameter is compared to a corresponding measured operational parameter to identify inefficiencies associated with operation of the aircraft. Without the use of the trajectory predictor 22, the accuracy of the computed operational parameter may be insufficient to identify variations between the computed operational parameter and the corresponding measured operational parameter. In contrast, the systems and methods described herein utilize trajectory predictor data to generate an accurate computed operational parameter, thereby facilitating determination of operational parameter variations with sufficient accuracy to identify inefficiencies in the operation of the aircraft.

Figure 4:
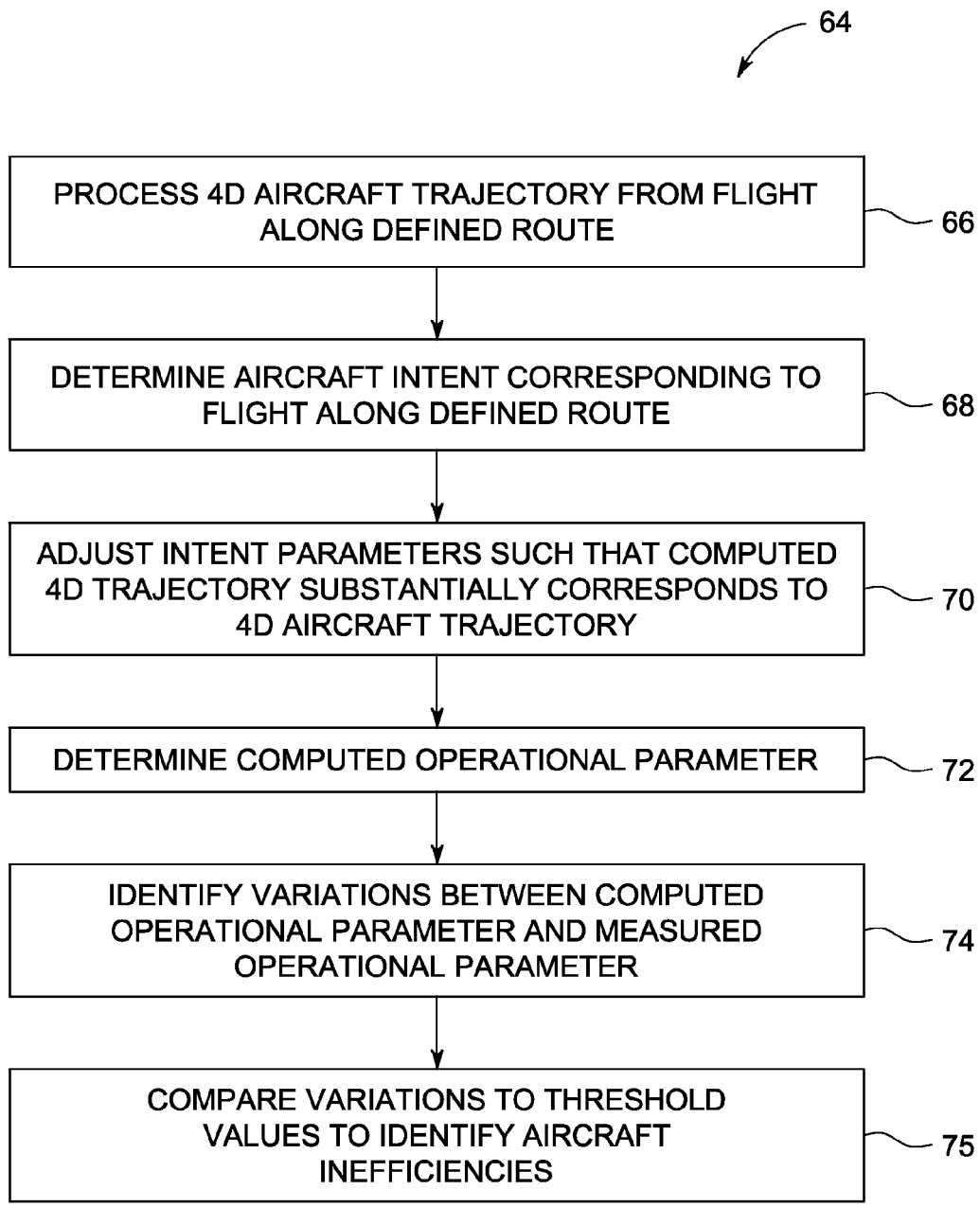
FIG. 4 is a flowchart of an embodiment of a method for identifying variations in an aircraft operational parameter.

FIG. 4 is a flowchart of an embodiment of a method 64 for identifying variations in an aircraft operational parameter. First, as represented by block 66, a 4D aircraft trajectory is processed for a flight along a defined route. As previously discussed, the 4D aircraft trajectory may be provided, for example, by an onboard data recorder or from another trajectory tracking source. Next, as represented by block 68, an aircraft intent corresponding to the flight along the defined route is determined. The aircraft intent is determined based at least in part on an aircraft performance model from a trajectory predictor. In certain embodiments, the aircraft intent is also determined based at least in part on multiple measured 4D aircraft trajectories from corresponding previous flights along the defined route. Because the aircraft intent is based at least in part on the aircraft performance model from the trajectory predictor, the aircraft intent may be significantly more accurate than aircraft intent determined based on measured trajectories alone.

After the aircraft intent is determined, multiple intent parameters are adjusted such that a computed 4D trajectory substantially corresponds to the 4D aircraft trajectory, as represented by block 70. As previously discussed, the computed 4D trajectory is determined based at least in part on the aircraft intent, the adjusted intent parameters, and the aircraft performance model from the trajectory predictor. Because the computed trajectory is based on accurate data from the trajectory predictor, the computed 4D trajectory may more accurately represent the actual aircraft trajectory than a trajectory determined based on aircraft intent alone. Next, as represented by block 72, a computed operational parameter is determined based at least in part on the computed 4D trajectory and the aircraft performance model from the trajectory predictor. As previously discussed, the computed operational parameter may include fuel usage, flight cost, and/or flight time, among other operational parameters. Because the computed operational parameter is based at least in part on accurate data from the trajectory predictor, the computed operational parameter accurately represents the operational parameter associated with the expected (canonical) trajectory.

The computed operational parameter is then compared to a corresponding measured operational parameter to identify variations between the parameters, as represented by block 74. For example, in certain embodiments, the computed operational parameter is a computed fuel usage, and the measured operational parameter is a measured fuel usage. In such embodiments, the computed fuel usage is determined (e.g., in block 72) based at least in part on the computed 4D trajectory and the aircraft performance model from the trajectory predictor. In addition, accurate atmospheric data and/or aircraft constraint data from the trajectory predictor may also be used to determine the computed fuel usage. As previously discussed, because data from the trajectory predictor is used to compute the aircraft intent, the computed 4D trajectory, and the computed fuel usage, the computed fuel usage may accurately represent the fuel used by a theoretical flight along the expected (canonical) trajectory. Therefore, comparing the computed fuel usage to the measured fuel usage (e.g., measured by the onboard data recorder) provides an accurate representation of variations in fuel usage from an expected value, thereby facilitating identification of aircraft performance inefficiencies.

In certain embodiments, the operational parameter variations (e.g., variations in fuel usage) may enable an operator or an automated system (e.g., the system 40) to identify inefficiencies associated with operation of the aircraft. For example, improper trim, engine inefficiencies, and/or excessive drag may induce the aircraft to consume more fuel than expected. Accordingly, as represented by block 75, the operational parameter variations are compared to corresponding threshold values to identify aircraft inefficiencies. By way of example, if the variation in fuel usage is greater than 3 percent, 5 percent, 7 percent, 10 percent, or more, of the expected fuel usage, the aircraft may be identified as operating inefficiently. If an inefficient aircraft is identified, aircraft maintenance personnel, for example, may mitigate or repair the underlying cause of the inefficiency (e.g., by correcting the trim, repairing the engine, etc.), thereby enhancing the fuel efficiency of the aircraft.

While identifying excessive fuel usage is described above, it should be appreciated that the method may be utilized for identifying excessive deviation from an expected flight time, excessive flight costs, and/or other operational parameters. By way of example, identifying variations between an expected flight time and a measured flight time may enable an operator to adjust parameters associated with operation of the aircraft to achieve the expected flight time, thereby increasing operational efficiency. Similarly, identifying variations between an expected flight cost and a measured flight cost may enable flight planners to reduce costs, thereby increasing the efficiency across multiple aircraft of an airline, for example. As will be appreciated, flight cost may be based on a variety of parameters, such as fuel usage, flight time, maintenance costs, and crew costs, among others. Identifying and mitigating the cause of the operational parameter variations may reduce flight costs and enhance the overall efficiency of aircraft operations.

In certain embodiments, the method described above may be periodically repeated through the operational lifetime of an aircraft. For example, after certain flights (e.g., along a common route and/or along multiple routes), variations in one or more aircraft operational parameters may be identified. These variations may be analyzed as a function of time to enhance identification of inefficiencies associated with operation of the aircraft. By way of example, if the variation between the computed fuel usage and the measured fuel usage progressively increases with each flight, a first type of inefficiency (e.g., associated with one or more engines, the fuel delivery system, etc.) may be identified. Conversely, if the variation in fuel usage increases sharply between consecutive flight, a different type of inefficiency (e.g., associated with a trim setting, a fuel leak, etc.) may be identified. However, if the variations in an operational parameter remain substantially constant over multiple flights, the variations may be indicative of an inaccurate aircraft performance model. Accordingly, in such a situation, the trajectory predictor may be updated to reflect the actual performance of the aircraft, thereby enhancing the accuracy of the aircraft performance model and reducing variations in one or more operational parameters.

Furthermore, it should be appreciated that variations in operational parameters for multiple aircraft may be analyzed to determine an efficiency of a fleet (e.g., each plane of an airline). For example, the trajectory predictor may utilize an aircraft performance model that is generic to a type of aircraft (e.g., a Boeing 737-800, an Airbus A330-200, etc.), as compared to an aircraft-specific performance model. In such a configuration, a type-specific aircraft intent may be determined based on the type-specific aircraft performance model. Similar to the embodiment described above, intent parameters of the type-specific aircraft intent are adjusted such that a computed 4D trajectory substantially corresponds to the 4D aircraft trajectory. Next, computed operational parameters are determined and compared to measured operational parameters to determine type-specific variations. The type-specific variations (e.g., in fuel usage, flight time, flight cost, etc.) for each aircraft in a fleet may be compared to a threshold value to identify inefficiencies of the fleet. As a result, the underlying cause of the aircraft-specific and/or fleet-wide inefficiencies may be repaired and/or mitigated, thereby enhancing the operational efficiency of the fleet. In addition, if the variations in a fleet-wide operational parameter remain substantially constant over multiple flights/multiple aircraft, the variations may be indicative of an inaccurate type-specific aircraft performance model. Accordingly, in such a situation, the type-specific trajectory predictor may be updated to reflect the actual performance of the aircraft, thereby enhancing the accuracy of the aircraft performance model and reducing variations in one or more operational parameters.

In certain embodiments, the computed operational parameters associated with a flight along a defined route may be compared to the computed operational parameters of other flights along the defined route, thereby facilitating identification of procedural inefficiencies (e.g., inefficiencies associated with flying an inefficient trajectory). For example, the computed fuel usage of one flight along a defined route may be compared to the average computed fuel usage of other flights (e.g., of the same aircraft and/or of different aircraft) along the defined route. If the computed fuel usage is greater than the average computed fuel usage, a procedural inefficiency may be identified (even if the difference between the computed fuel usage and the measured fuel usage is less than the threshold value indicative of operational inefficiency). Identifying procedural inefficiencies may enable a flight planner or a flight planning system to adjust the trajectory of the aircraft on subsequent flights to increase the efficiency of the aircraft along the defined route (e.g., reduce fuel usage, reduce flight time, reduce flight costs, etc.).

Figure 5:
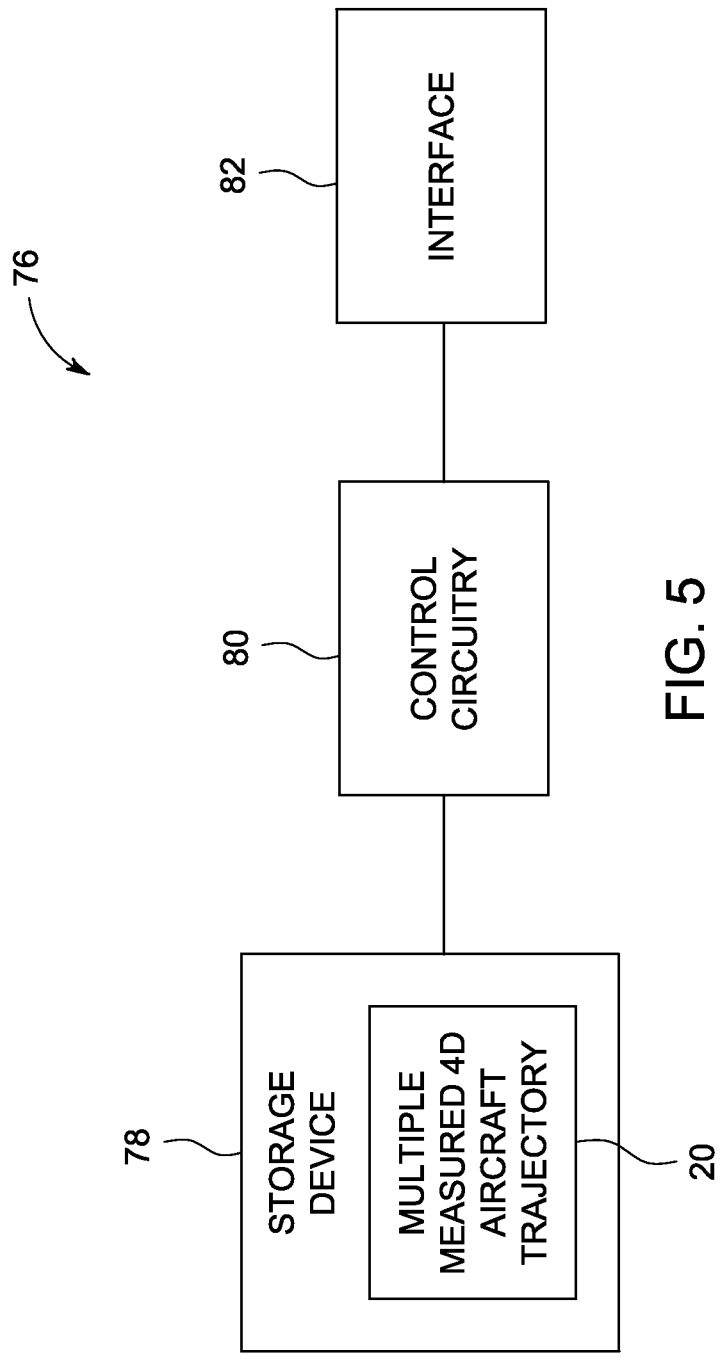
FIG. 5 is a block diagram of an embodiment of a system for identifying variations in an aircraft operational parameter.

FIG. 5 is a block diagram of an embodiment of a system 76 for identifying variations in an aircraft operational parameter. In the illustrated embodiment, the system includes a storage device 78 configured to store multiple 4D aircraft trajectories for a flight along a defined route 20. The storage device 78 is communicatively coupled to control circuitry 80 (e.g., including a processor) configured to identify variations in an aircraft operational parameter. For example, in certain embodiments, the control circuitry 80 is configured to determine an aircraft intent corresponding to the flight along the defined route based at least in part on an aircraft performance model from a trajectory predictor. In certain embodiments, the aircraft intent is also determined based at least in part on multiple measured 4D aircraft trajectories from corresponding previous flights along the defined route. As previously discussed, the aircraft intent may be determined by trajectory parameterization using a dual optimal smoothing technique, for example.

The control circuitry 80 is also configured to adjust multiple intent parameters such that a computed 4D trajectory substantially corresponds to the 4D aircraft trajectory stored in the storage device 78. As previously discussed, the computed 4D trajectory may be determined based at least in part on the aircraft intent, the adjusted intent parameters, and the aircraft performance model from the trajectory predictor. In addition, the control circuitry 80 is configured to determine a computed operational parameter based at least in part on the computed 4D trajectory and the aircraft performance model from the trajectory predictor. The control circuitry 80 is further configured to identify variations between the computed operational parameter and a corresponding measured operational parameter. In certain embodiments, the trajectory predictor (e.g., included within and/or simulated by the control circuitry 80) substantially corresponds to an onboard flight management system of an aircraft associated with the flight along the defined route.

In the illustrated embodiment, the system 76 also includes an interface 82 communicatively coupled to the control circuitry 80. The interface 82 is configured to present the variations to an operator. For example, the control circuitry 80 may identify variations between a computed fuel usage and a corresponding measured fuel usage. In certain embodiments, the interface 82 may present the variations to an operator (e.g., in a numerical format, in a graphical format, etc.) via a display. In addition, if the variations exceed corresponding threshold values (e.g., variation in fuel usage is greater than a desired percentage), the interface 82 may provide a visual and/or audible indication. In certain embodiments, the variations may also be stored in the storage device 78.

Figure 6:
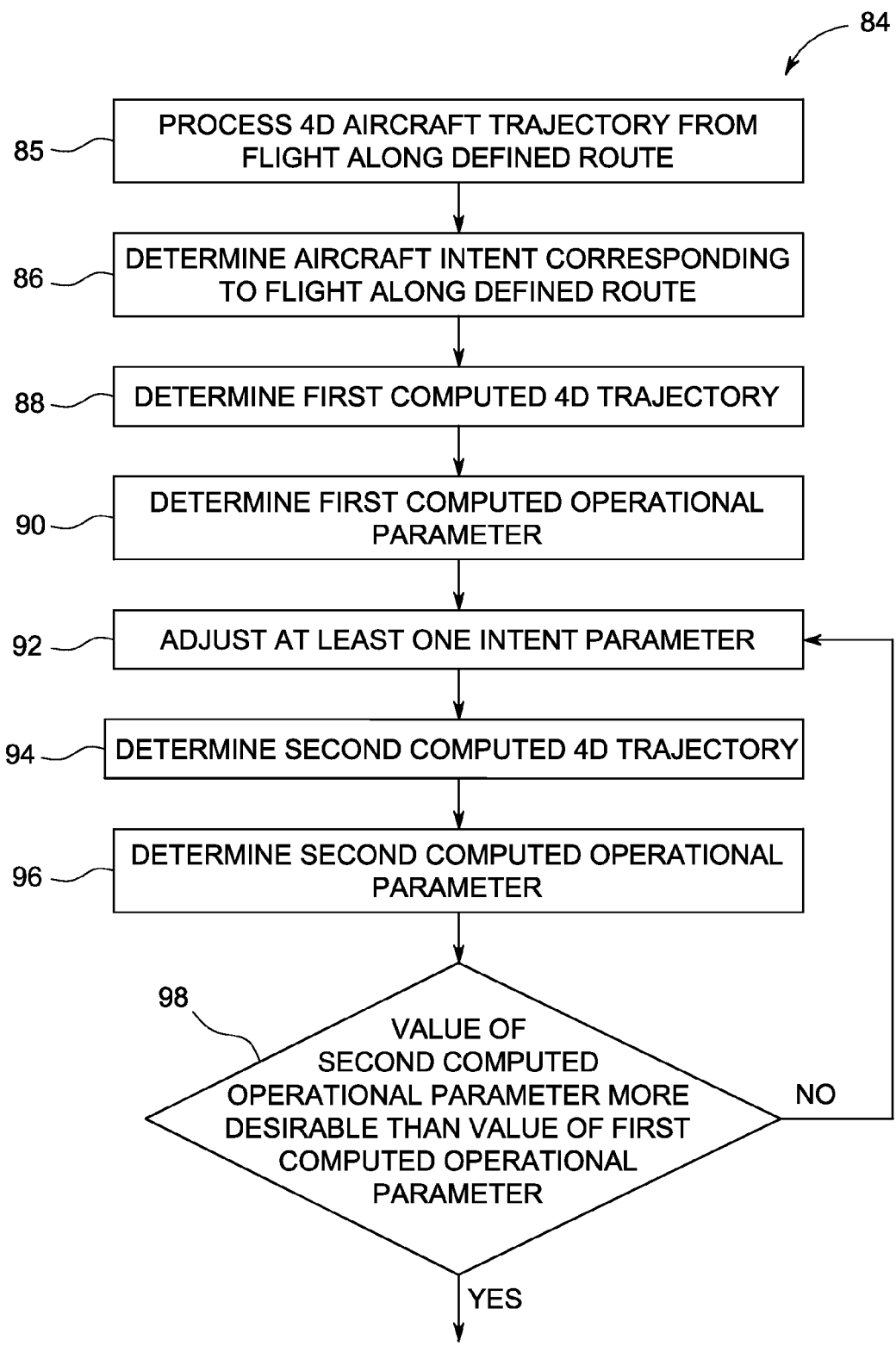
FIG. 6 is a flowchart of an embodiment of a method for enhancing an aircraft operational parameter.

FIG. 6 is a flowchart of an embodiment of a method 84 for enhancing an aircraft operational parameter. First, as represented by block 85, multiple 4D aircraft trajectories from previous flights along a defined route are processed (e.g., from RADAR tracking data, from an external source, from recorded data, etc.). The previous flights along the defined route may be associated with a single aircraft, or in certain embodiments, multiple aircraft. As represented by block 86, an aircraft intent corresponding to the flight along the defined route is then determined. As previously discussed, the aircraft intent may be determined by trajectory parameterization using a dual optimal smoothing technique, for example. Next, as represented by block 88, a first computed 4D trajectory is determined based at least in part on the aircraft intent and the aircraft performance model from the trajectory predictor. A first computed operational parameter is then determined based at least in part on the first computed 4D trajectory and the aircraft performance model from the trajectory predictor, as represented by block 90.

As represented by block 92, at least one intent parameter is iteratively adjusted. A second computed 4D trajectory is then determined based at least in part on the aircraft intent, the at least one intent parameter, and the aircraft performance model from the trajectory predictor, as represented by block 94. Next, a second computed operational parameter is determined based at least in part on the second computed 4D trajectory and the aircraft performance model from the trajectory predictor, as represented by block 96. As represented by block 98, a value of the second computed operational parameter is compared to a value of the first operational parameter. If the value of the second operational parameter is not more desirable than the value of the first operational parameter, the at least one intent parameter is further adjusted. The method 84 continues until the value of the second operational parameter is more desirable than the value of the first operational parameter. As a result, an improved intent parameter associated with an enhanced operational parameter is determined. The improved intent parameter may be utilized within an onboard flight management system to increase the efficiency of aircraft operations (e.g., by establishing a trajectory that results in an enhanced operational parameter).

By way of example, a first computed fuel usage may be determined based at least in part on the first computed 4D trajectory and the aircraft performance model from the trajectory predictor. The first computed fuel usage represents the expected fuel usage for a theoretical (canonical) flight along the defined route. An intent parameter is then iteratively adjusted until a second computed fuel usage (e.g., based on the adjusted intent parameter) is less than the first computed fuel usage. As a result, an improved intent parameter associated with reduced fuel usage is established. The improved intent parameter may be utilized within an onboard flight management system to reduce fuel usage of subsequent flights, thereby enhancing the efficiency of aircraft operations. While reducing fuel usage is discussed above, it should be appreciated that the method may be used to reduce flight time, reduce flight cost, and/or enhance other operational parameters. By way of example, an intent parameter, such as calibrated airspeed, may be iteratively adjusted to provide a more desirable time of arrival at a waypoint. In addition, an intent parameter, such as a location of a waypoint, may be iteratively adjusted to reduce the length of a flight path. The improved intent parameters associated with the more desirable waypoint arrival time and/or with the reduced flight path length may be utilized within an onboard flight management system to enhance aircraft operation on subsequent flights.

Figure 7:
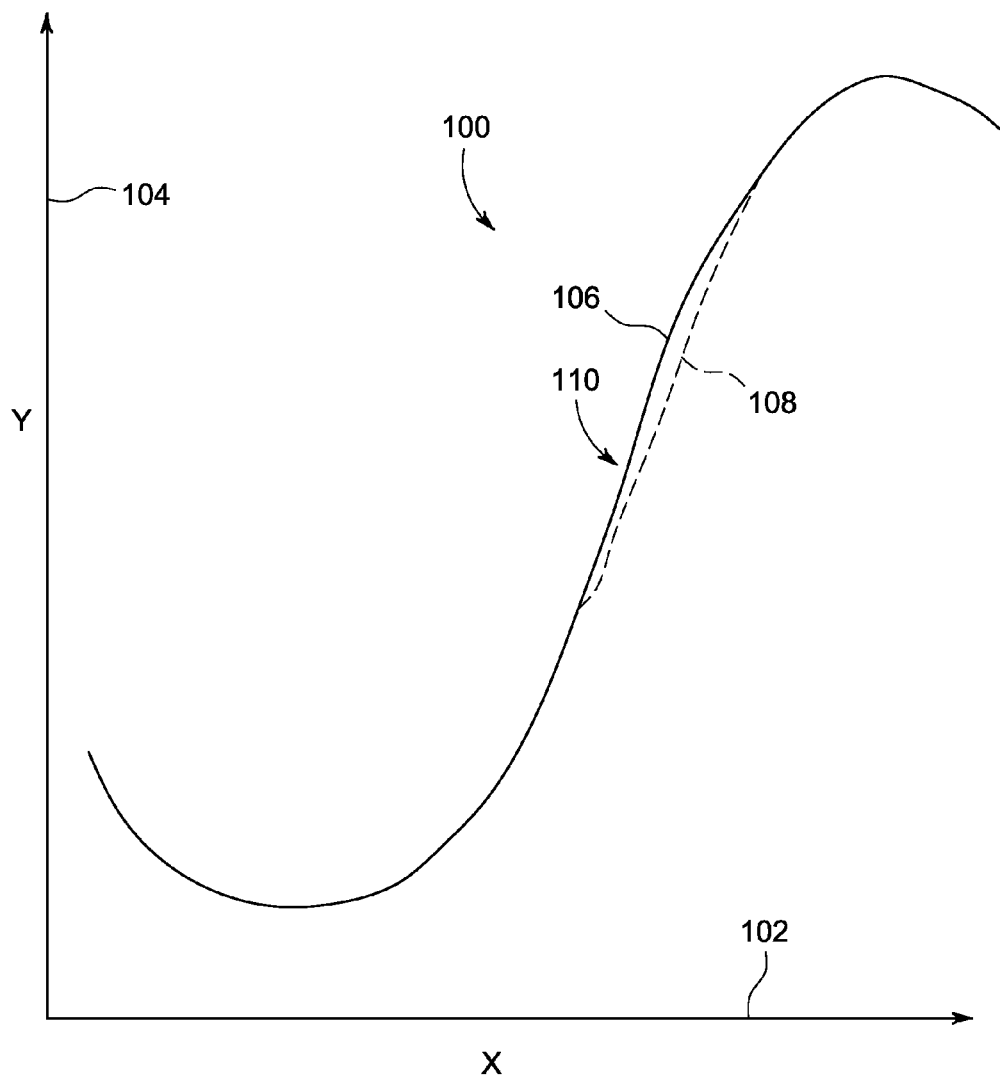
FIG. 7 is a chart of an exemplary aircraft trajectory, including a variation associated with modification to an intent parameter.

FIG. 7 is a chart of an exemplary aircraft trajectory, including a variation associated with modification to an intent parameter. The illustrated chart includes a plot 100 of an aircraft trajectory. As illustrated, the x-axis 102 represents a first coordinate of a flight path (e.g., longitude), and the y-axis 104 represents a second coordinate of the flight path (e.g., latitude). An aircraft trajectory 106 illustrates the flight path in two-dimensions within the coordinate system defined by the x-axis 102 and the y-axis 104. In the illustrated embodiment, the trajectory 106 corresponds to a computed aircraft intent (e.g., based at least in part on multiple 4D aircraft trajectories from previous flights along a desire route and an aircraft performance model from a trajectory predictor).

As discussed above, an operational parameter may be enhanced by iteratively adjusting an intent parameter until a computed operational parameter based on the adjusted intent parameter has a more desirable value than a computed operational parameter based on the non-adjusted intent parameter. In the illustrated embodiment, the curve 108 represents a variation in the trajectory associated with the adjusted intent parameter. For example, the illustrated trajectory 106 includes a coordinate turn 110 at a desired bank angle. By adjusting an intent parameter (e.g., angle of turn, speed at a waypoint, load factor limit, etc.) associated with the bank angle, the trajectory is modified, as represented by the curve 108. A computed operational parameter associated with the modified trajectory is then determined and compared to the computed operational parameter associated with the unmodified trajectory. If the value of the operational parameter is enhanced by the adjusted intent parameter, the adjusted intent parameter may be utilized (e.g., within an onboard flight management system) to establish a trajectory substantially corresponding to the modified trajectory 108. As a result, the operational efficiency of the aircraft may be enhanced.

In certain embodiments, an aggregate operational parameter for a fleet of aircraft may be enhanced by iteratively adjusting an intent parameter until a computed aggregate operational parameter based on the adjusted intent parameter has a more desirable value than a computed aggregate operational parameter based on the non-adjusted intent parameter. For example, an intent parameter, such as Mach number at cruise, may be adjusted, and a modified trajectory for each aircraft in the fleet may be computed. A computed operational parameter associated with each modified trajectory is then determined and aggregated (e.g., via a statistical weighted averaging process). If the value of the aggregate operational parameter is enhanced by the adjusted intent parameter, the adjusted intent parameter may be utilized (e.g., within an onboard flight management system of each aircraft in the fleet) to enhance the operational efficiency of the fleet.

It should be appreciated that the systems and methods described above may be utilized within an onboard aircraft system and/or a ground-based system. For example, the method 64 for identifying variations in an aircraft operational parameter may be executed onboard an aircraft while the aircraft is in flight (e.g., via the system 76). In such a configuration, an interface (e.g., the interface 82) may present the variations to a pilot and/or flight engineer (e.g., in a numerical format, in a graphical format, etc.) via a display. In addition, if the variations exceed corresponding threshold values (e.g., variation in fuel usage is greater than a desired percentage), the interface may provide a visual and/or audible indication, thereby alerting the pilot and/or the flight engineer. In alternative embodiments, the method 64 for identifying variations in an aircraft operational parameter may be executed on a ground-based system. Similarly, it should be appreciated that the method 84 for enhancing an aircraft operational parameter may be executed on a ground-based system (e.g., by processing 4D aircraft trajectories from recorded RADAR data) and/or on an onboard aircraft system (e.g., by processing 4D aircraft trajectories stored within the onboard aircraft system and/or received from a flight management system).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for identifying variations in aircraft operational parameters, comprising:
  processing a four-dimensional (4D) aircraft trajectory for a flight along a defined route;
  determining an aircraft intent corresponding to the flight along the defined route based at least in part on an aircraft performance model from a trajectory predictor, wherein the aircraft intent comprises a plurality of segments and a corresponding plurality of intent parameters;
  adjusting the plurality of intent parameters such that a computed 4D trajectory substantially corresponds to the 4D aircraft trajectory, wherein the computed 4D trajectory is determined based at least in part on the aircraft intent, the adjusted plurality of intent parameters, and the aircraft performance model from the trajectory predictor;
  determining a computed operational parameter based at least in part on the computed 4D trajectory and the aircraft performance model from the trajectory predictor; and
identifying variations between the computed operational parameter and a corresponding measured operational parameter.

2. The method of claim 1, wherein the trajectory predictor computes substantially similar trajectories and/or operational parameters as an onboard flight management system of an aircraft associated with the flight along the defined route.

3. The method of claim 1, wherein the computed operational parameter comprises at least one of a computed fuel usage, a computed flight cost, or a computed flight time, and the measured operational parameter comprises at least one of a measured fuel usage, a measured flight cost, or a measured flight time.

4. The method of claim 1, comprising comparing the variations to corresponding threshold values to identify aircraft inefficiencies.

5. The method of claim 1, wherein the aircraft intent is determined by trajectory parameterization using a dual optimal smoothing technique.

6. The method of claim 5, wherein the dual optimal smoothing technique comprises interacting multiple mode smoothing.

7. The method of claim 1, wherein the 4D aircraft trajectory originates from an onboard data recorder.

8. The method of claim 1, wherein the computed 4D trajectory, the computed operational parameter, the aircraft intent, or a combination thereof, is determined based at least in part on atmospheric data associated with the flight along the defined route.

9. A system for identifying variations in aircraft operational parameters, comprising:
a storage device configured to store a previously recorded four-dimensional (4D) aircraft trajectory for a flight along a defined route;
control circuitry communicatively coupled to the storage device, wherein the control circuitry is configured to determine an aircraft intent corresponding to the previously recorded 4D aircraft trajectory along the defined route based at least in part on an aircraft performance model from a trajectory predictor, the aircraft intent comprises a plurality of segments and a corresponding plurality of intent parameters, the control circuitry is configured to adjust the plurality of intent parameters from a set of initial estimates such that a newly computed 4D trajectory substantially corresponds to the 4D aircraft trajectory, the newly computed 4D trajectory is determined based at least in part on the derived aircraft intent, the adjusted plurality of intent parameters, and the aircraft performance model from the trajectory predictor, the control circuitry is configured to determine a computed operational parameter based at least in part on the newly computed 4D trajectory and the aircraft performance model from the trajectory predictor, and the control circuitry is configured to identify variations between the computed operational parameter and a corresponding measured operational parameter from the previously recorded 4D trajectory; and
an interface communicatively coupled to the control circuitry, wherein the interface is configured to present the variations to an operator of the system.

10. The system of claim 9, wherein the computed operational parameter comprises a computed fuel usage, and the measured operational parameter comprises a measured fuel usage.

11. The system of claim 9, wherein the trajectory predictor computes substantially similar trajectories and/or operational parameters as an onboard flight management system of an aircraft associated with the flight along the defined route.

12. The system of claim 9, wherein the aircraft intent is determined by trajectory parameterization using a dual optimal smoothing technique.

13. The system of claim 9, wherein the aircraft intent is determined based at least in part on a plurality of measured 4D aircraft trajectories from a corresponding plurality of previous flights along the defined route.

14. A method for enhancing aircraft operational parameters, comprising:

determining an aircraft intent corresponding to a flight along a defined route based at least in part on a plurality of four-dimensional (4D) aircraft trajectories from a corresponding plurality of previous flights along the defined route and an aircraft performance model from a trajectory predictor, wherein the aircraft intent comprises a plurality of segments and a corresponding plurality of intent parameters;
determining a first computed 4D trajectory based at least in part on the aircraft intent and the aircraft performance model from the trajectory predictor,
determining a first computed operational parameter based at least in part on the first computed 4D trajectory and the aircraft performance model from the trajectory predictor; and
iteratively adjusting at least one intent parameter such that a second computed operational parameter of a second computed 4D trajectory has a more desirable value than the first computed operational parameter of the first computed 4D trajectory, wherein the second computed 4D trajectory is determined based at least in part on the aircraft intent, the at least one intent parameter, and the aircraft performance model from the trajectory predictor, and the second computed operational parameter is determined based at least in part on the second computed 4D trajectory and the aircraft performance model from the trajectory predictor.

15. The method of claim 14, wherein each computed operational parameter comprises a computed fuel usage, a computed flight cost, a computed flight time, or a combination thereof.

16. The method of claim 14, wherein the aircraft intent is determined by trajectory parameterization using a dual optimal smoothing technique.

17. The method of claim 14, wherein each computed 4D trajectory, each computed operational parameter, or a combination thereof, is determined based at least in part on a plurality of constraint data associated with the corresponding plurality of previous flights along the defined route.

18. The method of claim 14, wherein each computed 4D trajectory, each computed operational parameter, or a combination thereof, is determined based at least in part on a plurality of atmospheric data associated with the corresponding plurality of previous flights along the defined route.

19. The method of claim 4, wherein the aircraft inefficiencies include improper trim, engine inefficiencies, and excessive drag.

20. The method of claim 1, wherein the 4D aircraft trajectory originates from radar data.

* * * * *